US009039255B2

(12) United States Patent
Kase

(10) Patent No.: US 9,039,255 B2
(45) Date of Patent: May 26, 2015

(54) LIGHT SOURCE DEVICE, PROJECTOR, AND LIGHT SOURCE DEVICE FABRICATION METHOD

(75) Inventor: Toshifumi Kase, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 536 days.

(21) Appl. No.: 13/474,000

(22) Filed: May 17, 2012

(65) Prior Publication Data

US 2012/0293777 A1 Nov. 22, 2012

(30) Foreign Application Priority Data

May 18, 2011 (JP) ................................. 2011-111418

(51) Int. Cl.
*G03B 21/20* (2006.01)
*G03B 21/14* (2006.01)
*G03B 21/16* (2006.01)
*G03B 33/12* (2006.01)
*H04N 9/31* (2006.01)

(52) U.S. Cl.
CPC .............. *G03B 21/145* (2013.01); *G03B 21/16* (2013.01); *G03B 21/2013* (2013.01); *G03B 21/204* (2013.01); *G03B 33/12* (2013.01); *H04N 9/3161* (2013.01); *H04N 9/3111* (2013.01)

(58) Field of Classification Search
CPC .......... G03B 21/14; G03B 21/20; B23P 11/00
See application file for complete search history.

(56) References Cited

U.S. PATENT DOCUMENTS

2006/0146298 A1* 7/2006 Lin ................................ 353/101
2007/0229770 A1* 10/2007 Miyata et al. .................... 353/33
2014/0016106 A1* 1/2014 Lin et al. .......................... 353/87

FOREIGN PATENT DOCUMENTS

| JP | 53003364 U | 1/1978 |
|----|------------|--------|
| JP | 57188542 U | 11/1982 |
| JP | 02125267 U | 10/1990 |
| JP | 2001-267670 A | 9/2001 |
| JP | 2011075899 A | 4/2011 |

OTHER PUBLICATIONS

Japanese Office Action dated Feb. 5, 2015, issued in counterpart Japanese Application No. 2011-111418.

* cited by examiner

*Primary Examiner* — Thomas M Sember
(74) *Attorney, Agent, or Firm* — Holtz, Holtz, Goodman & Chick PC

(57) ABSTRACT

A light source device which can prevent the removal of light source elements of a light source device within a projector casing, a projector and a light source fabrication method are provided. An excitation light shining device 70 has a lens holding structure 79 and a light source holding structure 80 which are integrated together with excitation light sources held therebetween. The lens holding structure 79 has through holes 79f which first screw members 84 penetrate, and the light source holding structure 80 has screw holes 80h and screw holes 80k communicating with the screw holes 80h substantially at right angles. With the first screw members 84 penetrating the through holes 79f to be screwed into the screw holes 80h, screw thread portions of the first screw members 84 are pressed to be deformed plastically by distal end portions of the second screw members 85.

14 Claims, 11 Drawing Sheets

LIGHT SOURCE DEVICE, PROJECTOR, AND LIGHT SOURCE DEVICE FABRICATION METHOD

CROSS-REFERENCE TO RELATED APPLICATIONS

This application is based upon and claims the benefit of priority under 35 USC 119 of Japanese Patent Application No. 2011-111418 filed on May 18, 2011, the entire contents of which are incorporated herein by reference.

BACKGROUND OF THE INVENTION

1. Field of the Invention

The present invention relates to a light source device, a projector and a light source device fabrication methods.

2. Description of the Related Art

In these days, data projectors are used on many occasions as image projection units which project images including images of screens of personal computers and video images, as well as images based on image data which is stored in memory cards on to a screen. In these projectors, light emitted from a light source is collected on to a micromirror display element called a digital micromirror device (DMD) or a liquid crystal panel for projection of color images on to a screen.

Conventionally, the mainstream of these projectors has been those which utilize a high-intensity discharge lamp as a light source. However, in recent years, there have been made many developments on data projectors which use, as a light source, a light source element such as a light emitting diode, a laser diode, an organic EL device or a luminescent material.

Incidentally, there are fears that a light source element such as a laser diode and the like is removed intentionally from a projector, resulting in a drawback that the laser diode is used for a different application or the user is erroneously exposed to a laser beam.

For example, Japanese Unexamined Patent Application No. 2001-267670 (JP-A-2001-267670) discloses a laser unit which prevents an intended removal of a laser oscillator from the laser unit for other applications.

However, JP-A-2001-267670 discloses the laser unit which utilizes a technology in which part of the laser oscillator is broken when the laser oscillator is removed from the laser unit. Thus, JP-A-2001-267670 does not disclose a construction which makes it difficult for the light source element to be removed from the laser unit.

BRIEF SUMMARY OF THE INVENTION

The invention has been made in view of the problem inherent in the related art that has been described above, and an object thereof is to provide a light source device which can prevent the removal of a light source element thereof from a projector casing with a simple construction and without performing complex and troublesome steps at the time of production, a projector which incorporates the light source device, and light source device and projector fabrication methods.

With a view to attaining the object, according to a first aspect of the invention, there is provided a light source device including a light source element which is held between a first holding structure and a second holding structure, wherein the first holding structure has a through hole which is formed so as to extend towards the second holding structure and which allows a first screw member to be put therethrough, wherein the second holding structure has a first screw hole which communicates with the through hole and into which a rod-shaped main body portion of the first screw member is screwed and a second insertion hole which communicates with the first screw hole substantially at right angles and into which a second insertion member is inserted, and wherein in a state in which the first screw member is put through the through hole and screwed into the first screw hole, the second insertion member presses a screw thread portion of the main body portion of the first screw member so as to deform the screw thread portion plastically by a distal end portion of the second insertion member.

According to a second aspect of the invention, there is provided a projector comprising the light source device set forth in the first aspect, a display element which forms an optical image with light emitted by the light source device, a projection side optical system which projects the optical image formed by the display element on to a screen, and a projector control unit which controls the light source device and the display element.

According to a third aspect of the invention, there is provided a light source device fabrication method for fabricating a light source device which holds a light source element between a first holding structure and a second holding structure comprising a first preparatory step of preparing in the first holding structure a through hole which is formed so as to extend towards the second holding structure and which allows a first screw member to be put therethrough, a second preparatory step of preparing in the second holding structure (a) a first screw hole which communicates with the through hole and into which a rod-shaped main body portion of the first screw member is screwed and (b) a second insertion hole which communicates with the first screw hole substantially at right angles and into which a second insertion member is inserted, a screwing step of allowing the first screw member to be put through the through hole to thereby be screwed into the first screw hole, and a plastic deformation step of inserting the second insertion member into the second insertion hole so that a distal end of the second insertion member presses a screw thread portion of the first screw member so as to plastically deform the screw thread portion.

According to a fourth aspect of the invention, there is provided a projector fabrication method including the light source device fabrication method set forth in the third aspect, the projector fabrication method having an incorporating step of incorporating a light source device fabricated by the light source device fabrication method into a casing of a projector and an optical characteristics adjusting step of adjusting optical characteristics of the projector, wherein the optical characteristics adjusting step is executed after the screwing step and before the plastic deformation step.

Advantages of the invention will be set forth in the following detailed description of the invention or will be obvious in part from the description. Alternatively, the advantages may be learned through practice of the invention. The advantages of the invention may be realized or obtained by instrumentalities or combinations thereof which will be described in the following description.

BRIEF DESCRIPTION OF THE DRAWINGS

The accompanying drawings, which are incorporated in and constitute part of the specification, illustrate an embodiment of the invention and serve to explain the principles of the invention together with the general description given above and the detailed description of the embodiment given below.

DETAILED DESCRIPTION OF THE PREFERRED EMBODIMENT

Hereinafter, am embodiment of the invention will be described by reference to the drawings.

Figure 1:
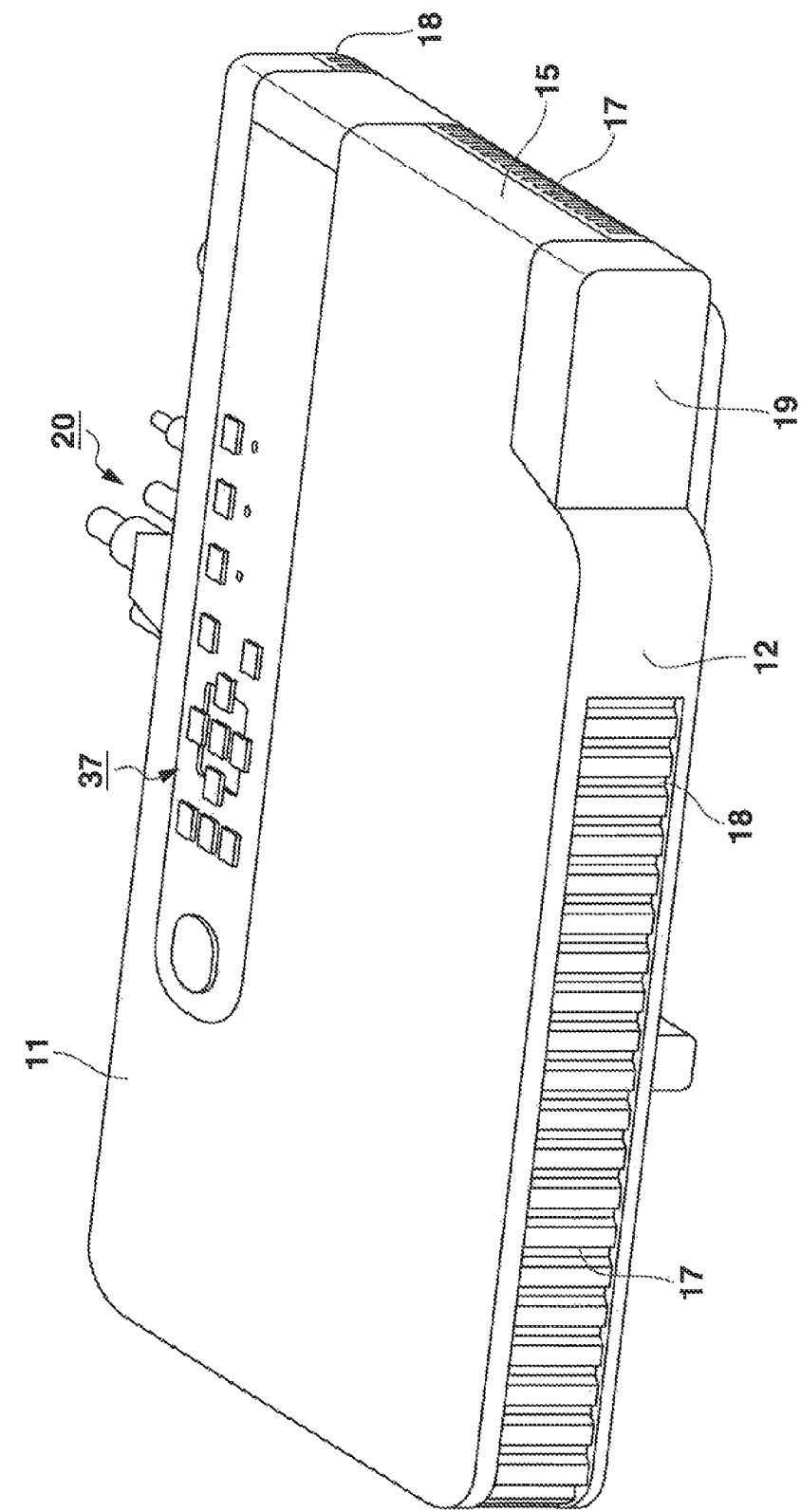
FIG. 1 is a perspective view showing an external appearance of a projector according to an embodiment of the invention.

FIG. 1 is a perspective view showing an external appearance of a projector 10.

In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a lens cover 19 which covers a projection opening which is laid to a side of a front side panel 12 which is referred to as a front panel of a projector casing. Additionally, pluralities of outside air inlet ports 18 and inside air outlet ports 17 are formed in the front side panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display element, a control circuit or the like overheats.

Further, provided on a back side or a back side panel of the projector casing are an input/output connector unit where USB terminals, an image signal input D-SUB terminal, an S terminal, an RCA terminal and the like are provided and various types of terminals 20 including a power supply adaptor plug. Additionally, a plurality of outside air inlet ports are formed in the back side panel. In addition, pluralities of inside air outlet ports 17 are formed in a right-hand side panel which is a lateral side panel of the projector casing which is not shown and a left-hand side panel 15 which is a lateral side panel shown in FIG. 1. Further, an outside air inlet port 18 is also formed in a corner portion near the back panel of the left-hand side panel 15.

Figure 2:
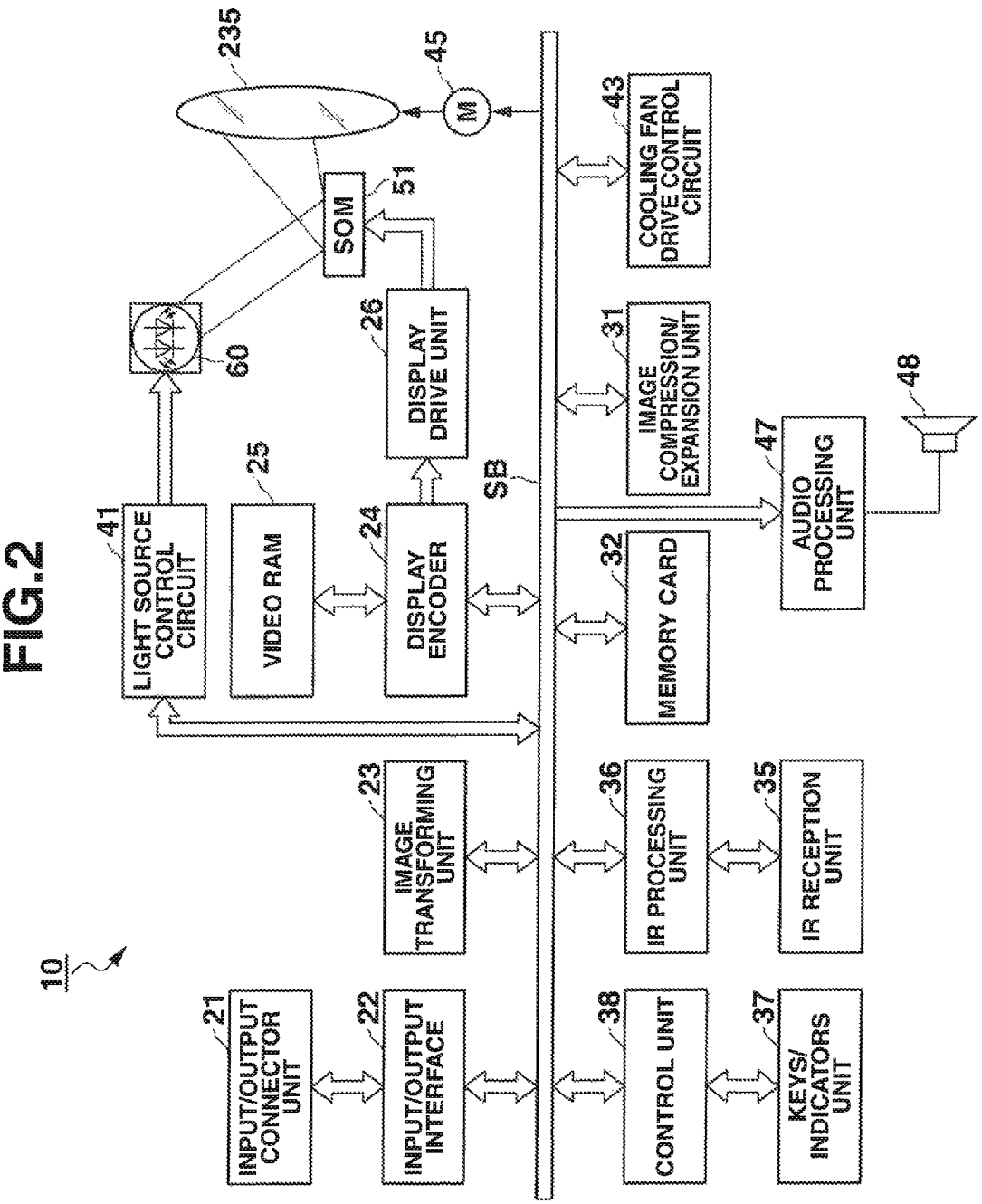
FIG. 2 is a functional block diagram of the projector according to the embodiment of the invention.

Next, a projector control unit of the projector 10 will be described by use of a functional block diagram shown in FIG. 2. The projector control unit includes a control unit 38, an input/output interface 22, an image transforming unit 23, a display encoder 24, a display drive unit 26 and the like.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display element control unit and drives a display element 51 which is a spatial optical modulator (SOM) at an appropriate frame rate in response to the image signal outputted from the display encoder 24. In this projector 10, a pencil of light which is emitted from a light source unit 60 is shone onto the display element 51 via a light guiding optical system to thereby form an optical image based on reflected light reflected by the display element 51. The image so formed is then projected on to a screen, not shown, for display thereon via a projection side optical system, which will be described later. In addition, a movable lens group 235 of the projection side optical system is driven by a lens motor 45 for zooming or focusing.

An image compression/expansion unit 31 performs a recording operation in which a luminance signal and a color difference signal of an image signal are data compressed through ADCT and Huffman coding operations, and the compressed data is sequentially written on a memory card 32 which is configured as a detachable recording medium.

Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

The control unit 38 governs the control of respective operations of circuitries within the projector 10 and includes a CPU, a ROM which stores in a fixed fashion operation programs of various types of settings and a RAM which is used as a work memory.

Operation signals generated at the keys/indicators unit 37 which includes of the main keys, indicators and the like provided on the upper side panel 11 of the projector casing are sent out directly to the control unit 38. Key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control unit 38 controls a light source control circuit 41 which is configured as a light source control unit. This light source control circuit 41 controls individually the emission of light of an excitation light shining device, a red light source device and a blue light source device of the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60 so as to control the rotating speed of a cooling fan based on the results of the temperature detection. Additionally, the control unit 38 also causes the cooling fan drive control circuit 43 to make the cooling fan continue to rotate even after the power supply of a projector main body is switched off by use of a timer or the like. In addition, the control unit 38 controls so as to make the power supply to the projector main body be cut off depending upon the results of the temperature detection by the temperature sensors.

Next, an internal construction of the projector 10 will be described.

Figure 3:
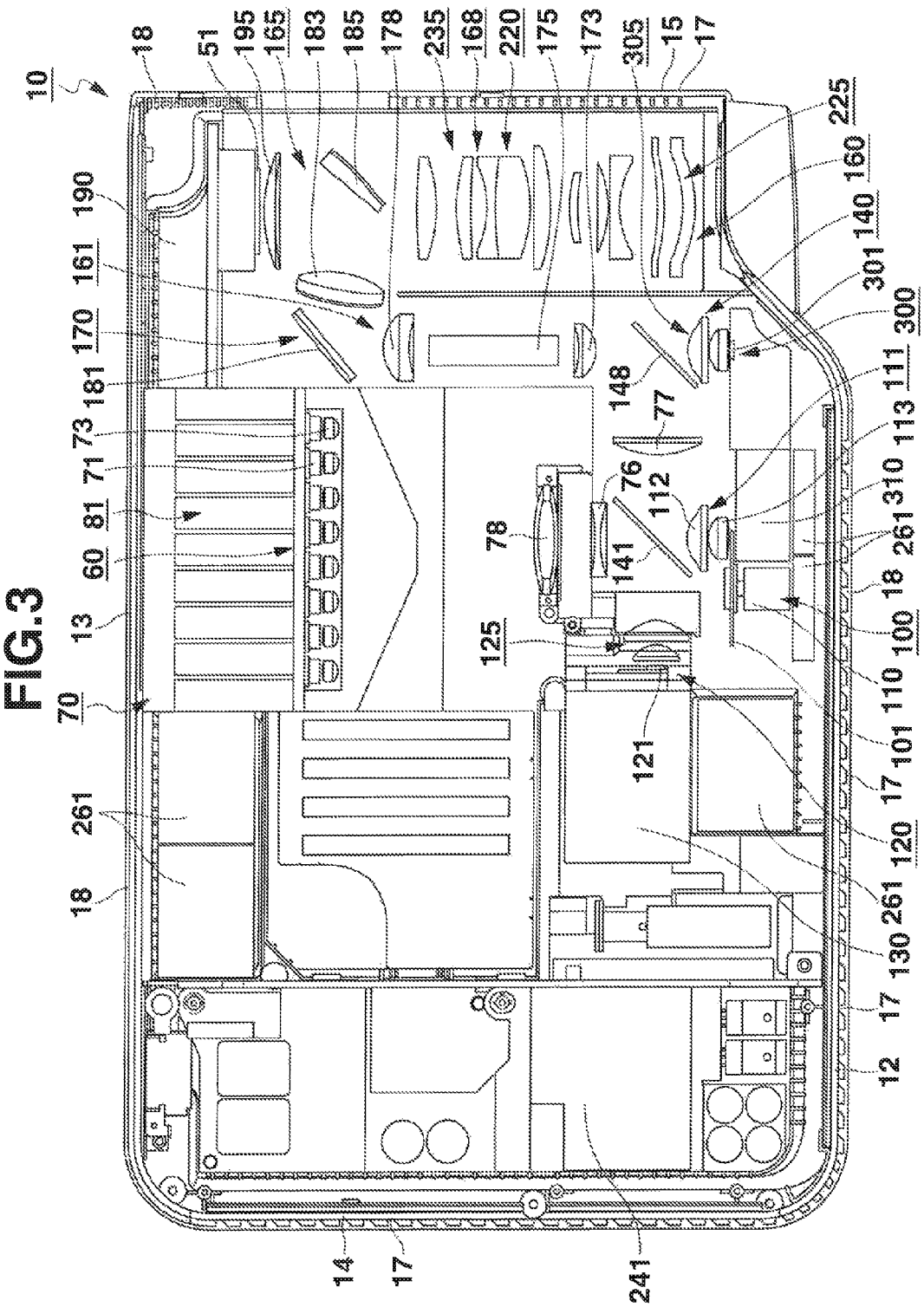
FIG. 3 is an exemplary plan view showing an internal construction of the projector according to the embodiment of the invention.

FIG. 3 is an exemplary plan view showing an internal construction of the projector 10.

As shown in FIG. 3, the projector 10 includes a control circuit board 241 in the vicinity of the right side panel 14. This control circuit board 241 includes a power supply circuit block, a light source control block and the like. Additionally, the projector 10 includes the light source unit 60 which is provided to a side of the control circuit board 241, that is, at a substantially central portion of the projector casing. Further, the projector 10 includes an optical system unit 160 between the light source unit 60 and the left-hand side panel 15.

The light source unit 60 includes an excitation light shining device 70, a luminescent light emitting device 100, a blue light source device 300, a red light source device 120 and a light guiding optical system 140. The excitation light shining device 70 is disposed at a substantially transversely central portion of the projector casing and in proximity to the back side panel 13. The luminescent light emitting device 100 is disposed on the axis of a pencil of light emitted from the excitation light shining device 70 and in proximity to the front side panel 12. The blue light source device 300 is disposed in proximity to the front side panel 12 so as to be parallel to a pencil of light which is emitted from the luminescent light emitting device 100. The red light source device 120 is disposed between the excitation light shining device 70 and the luminescent light emitting device 100. The light guiding optical system 140 turns the directions of axes of light emitted from the luminescent light emitting device 100, light emitted from the red light source device 120 and light emitted from the blue light source device 300 so that the axes of the light of different colors emitted from the luminescent light emitting device 100 and the light source devices 120, 300 are collected to the same optical axis so as to be guided to an entrance port of a light tunnel 175 which constitutes a predetermined plane.

The excitation light shining device 70 includes excitation light sources 71 functioning as light source elements which are disposed so that optical axes thereof are at right angles to the back side panel 13, a collective lens 78 which collects light emitted from the excitation light sources 71, and heat sinks 81 which are disposed between the excitation light sources 71 and the back side panel 13.

The excitation light sources 71 of the light source device are arranged into a matrix of three rows and eight columns of a total of 24 blue laser diodes. Collimator lenses 73 are disposed individually on optical axes of the blue laser diodes. The collimator lenses 73 are collective lenses which transform light emitted from the blue laser diodes into parallel light. The collimator lenses 73 according to the embodiment emit light rays emitted from the individual excitation light sources 71 which function as light source elements to the collective lens 78.

A cooling fan 261 is disposed in proximity to the heat sinks 81, and the excitation light sources 71 are cooled by the cooling fan 261 and the heat sinks 81.

The luminescent light emitting device 100 includes a luminescent wheel 101, a wheel motor 110 which rotationally drives the luminescent wheel 101 and a group of collective lenses 111 which collects pencils of luminescent light emitted from the luminescent wheel 101 in the direction of the back side panel 13. The luminescent wheel 101 functions as a luminescent plate which is disposed so as to be parallel to the front side panel 12, that is, so as to be at right angles to an optical axis of a pencil of light emitted from the excitation light shining device 70 via a concave lens 76. The group of collective lenses 111 includes a large-diameter convex lens 112 and a small-diameter convex lens 113, which are disposed in a straight line so that respective optical axes of those convex lenses coincide with an optical axis of the collective lens 78.

The luminescent wheel 101 is a circular disk-shaped metal base. An annular luminescent light emitting area is formed on the luminescent wheel 101 as a depressed portion. This annular luminescent light emitting area receives light emitted from the excitation light sources 71 as excitation light and emits luminescent light of green wavelength band. Thus, the luminescent wheel 101 functions as a luminescent plate which receives excitation light to emit luminescent light. In addition, a surface of a side of the luminescent wheel 101 which faces the excitation light sources 71 and includes the luminescent light emitting area is mirror finished through silver deposition, whereby a reflection plane which reflects light is formed on the surface. A layer of a green luminescent material is laid on this reflection plane.

Then, light emitted from the excitation light shining device 70 and shone on to the green luminescent material layer on the luminescent wheel 101 via the collimator lenses 73, the collective lens 78, the concave lens 76 and a first dichroic mirror 141 excites the green luminescent material in the green luminescent material layer. Pencils of luminescent light are emitted in every direction from the green luminescent material so excited and are then directed directly towards the excitation light sources 71 or are reflected on a reflection plane of the luminescent wheel 101 so as to be eventually directed towards the excitation light sources 71.

In addition, excitation light which is shone on to the metal base without being absorbed by the luminescent material in the luminescent material layer is reflected by the reflection plane to enter the luminescent material layer again, whereby the luminescent material is excited. Thus, by making the surface of the depressed portion on the luminescent wheel 101 into the reflection plane, the efficiency of utilization of excitation light emitted from the excitation light sources 71 can be enhanced, so that brighter luminescent light can be emitted from the luminescent wheel 101. The concave lens 76 transforms excitation light from the excitation light sources 71 into substantially parallel light.

In excitation light which is reflected on the reflection plane of the luminescent wheel 101 towards the luminescent material layer, excitation light which is emitted towards the excitation light sources 71 without being absorbed by the luminescent material passes through the first dichroic mirror 141, which will be described later, and luminescent light is reflected by the first dichroic mirror 141. Therefore, excitation light is emitted to the outside of the projector 10 in no case. Then, a cooling fan 261 is disposed between the wheel motor 110 and the front side panel 12, and the luminescent wheel 101 is cooled by this cooling fan 261.

The red light source device 120 includes a red light source 121 and a group of collective lenses 125 which collects light emitted from the red light source 121. This red light source 121 is disposed so that an optical axis thereof is at right angles to the optical axes of the excitation light sources 71. The red light source device 120 is disposed so that the optical axis thereof intersects the axis of light emitted from the excitation light shining device 70 and the axis of luminescent light of green wavelength band which is emitted from the luminescent wheel 101.

The red light source 121 is a red light emitting diode which is a semiconductor light emitting element which emits light of red wavelength band. Further, the red light source device 120 includes a heat sink 130 which is disposed on a side of the red light source 121 which faces the right-hand side panel 14. In addition, a cooling fan 261 is disposed between the heat sink 130 and the front side panel 12, and the red light source 121 is cooled by this cooling fan 261.

The blue light source 300 includes a blue light source 301 and a group of collective lenses 305 which collects light emitted from the blue light source 301. The blue light source 301 is disposed so that an optical axis thereof is parallel to the optical axis of light emitted from the luminescent light emitting device 100. The blue light source device 300 is disposed so that the optical axis of light emitted therefrom intersects the optical axis of light emitted from the red light source device 120. The blue light source 301 is a blue light emitting diode which is a semiconductor light emitting element which emits light of blue wavelength band. Further, the blue light source device 300 includes a heat sink 310 which is disposed on a side of the blue light source 301 which faces the front side panel 12. A cooling fan 261 is disposed between the heat sink 310 and the front side panel 12, and the blue light source 301 is cooled by this cooling fan 261.

The light guiding optical system 140 includes collective lenses which collect pencils of light of red, green and blue wavelength bands, dichroic mirrors which turn the directions of optical axes of the pencils of light of red, green and blue wavelength bands to direct them to the same optical axis and the like.

Specifically speaking, in the light guiding optical system 140, the first dichroic mirror 141 is disposed in a position where the optical axes of light of blue wavelength band emitted from the excitation light shining device 70 and light of green wavelength band emitted from the luminescent wheel 101 intersect the optical axis of light of red wavelength band emitted from the red light source device 120. This first dichroic mirror 141 transmits light of blue and red wavelength bands and reflects light of green wavelength band to turn the direction of the optical axis of the green light by 90 degrees towards the left-hand side panel 15.

In addition, in the light guiding optical system 140, a second dichroic mirror 148 is disposed in a position where the optical axis of light of blue wavelength band emitted from the blue light source device 300 intersects the optical axis of light of red wavelength band emitted from the red light source device 120. This second dichroic mirror 148 transmits light of blue wavelength band and reflects light of green and red wavelength bands to turn the direction of the optical axis of the green light and the red light by 90 degrees towards the back side panel 13. Additionally, a collective lens 77 is disposed between the first dichroic mirror 141 and the second dichroic mirror 148. Further, a collective lens 173 is disposed in proximity to the light tunnel 175. This collective lens 173 collects light source light to the entrance port of the light tunnel 175.

The optical system unit 160 is configured into a substantially U-shape by three blocks such as an illumination side block 161 which is positioned to a left-hand side of the excitation light shining device 70, an image generating block 165 which is positioned in proximity to a position where the back side panel 13 intersects the left-hand side panel 15, and a projection side block 168 which is positioned between the light guiding optical system 140 and the left-hand side panel 15.

The illumination side block 161 includes part of a light source side optical system 170 which guides light source light emitted from the light source unit 60 to the display element 51 that is possessed by the image generating block 165. Included as the light source side optical system 170 that the illumination side block 161 possesses are the light tunnel 175 which transforms a pencil of light emitted from the light source unit 60 into a pencil of light in which the intensity thereof is uniformly distributed, a collective lens 178 which collects light emitted from the light tunnel 175, and an optical axis turning mirror 181 which turns the direction of the optical axis of a pencil of light emitted from the light tunnel 175 towards the image generating block 165.

The image generating block 165 has, as the light source side optical system 170, a collective lens 183 which collects the light source light which is reflected on the optical axis turning mirror 181 to the display element 51 and a shining mirror 185 which shines the pencil of light which passes through the collective lens 183 to the display element 51 at a predetermined angle. Further, the image generating block 165 includes a DMD which is the display element 51. A heat sink 190 is disposed between the display element 51 and the back side panel 13 for cooling the display element 51. Thus, the display element 51 is cooled by this heat sink 190. Additionally, a collective lens 195, which constitutes part of a projection side optical system 220, is disposed in proximity to the front of the display element 51.

The projection side block 168 has a group of lenses of the projection side optical system 220 which projects the "on" light which is reflected on the display element 51 on to the screen. This projection side optical system 220 includes a group of fixed lenses 225 which is incorporated in a fixed lens barrel and a group of movable lenses 235 which is incorporated in a movable lens barrel. These groups of lenses are configured as a variable focus lens having a zooming function, and the group of movable lenses 235 is moved by a lens motor for zooming and focusing.

Next, a construction of a bottom side of the projector 10 will be described.

Figure 4:
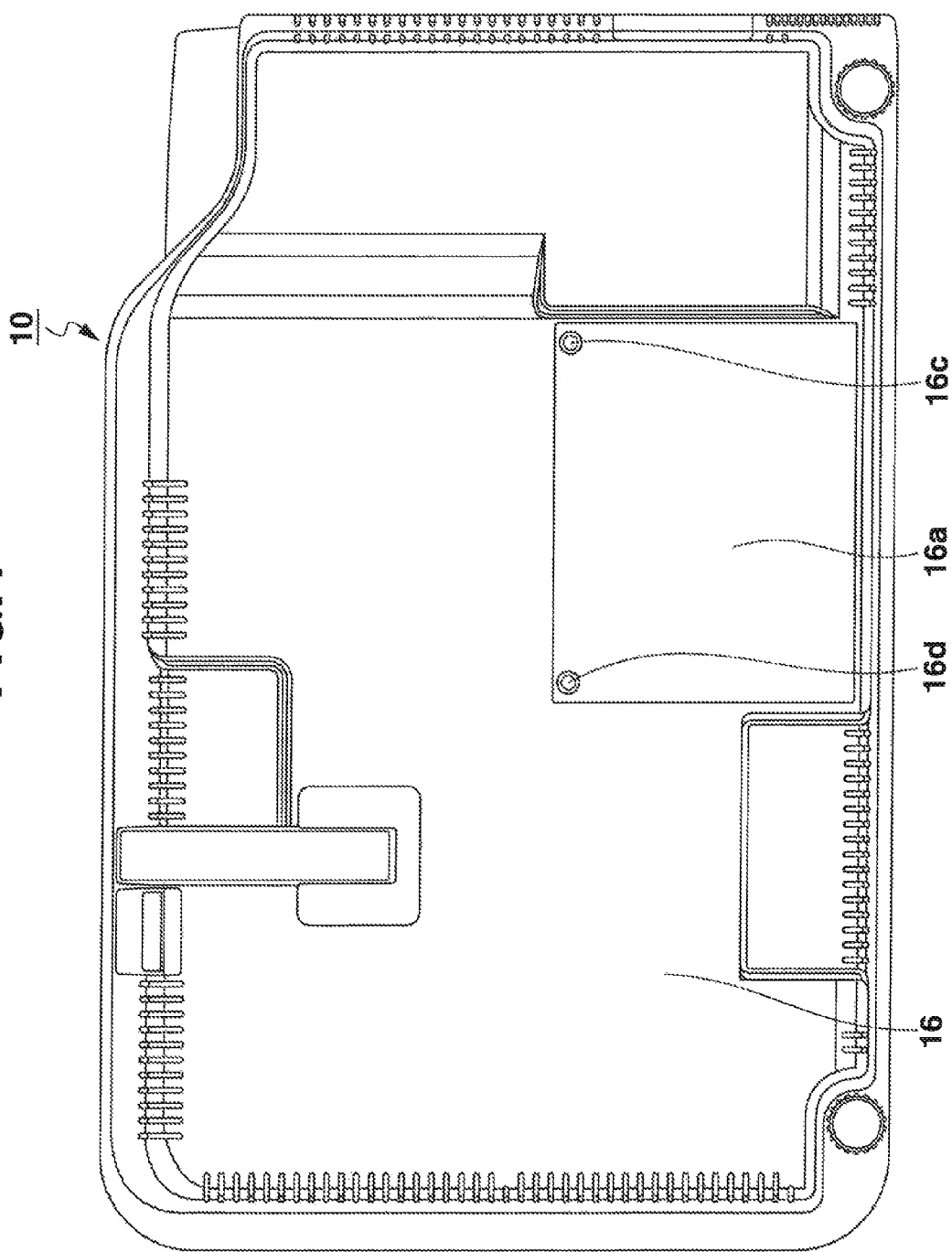
FIG. 4 is a bottom view of the projector according to the embodiment of the invention, showing a state in which a bottom panel lid is attached.
Figure 5:
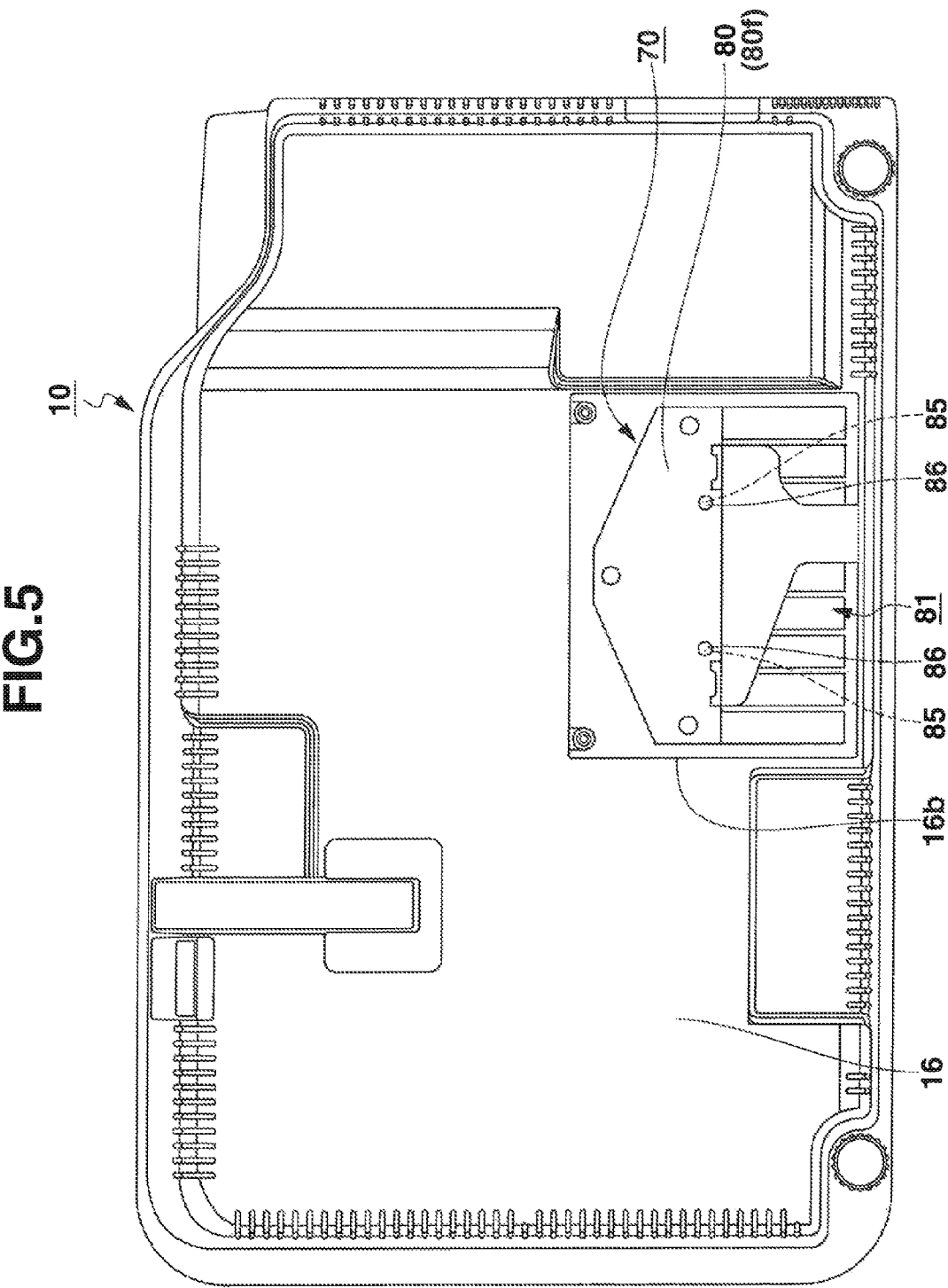
FIG. 5 is a bottom view of the projector according to the embodiment of the invention, showing a state in which the bottom panel lid is removed to expose a light source device.

FIG. 4 is a bottom view of the projector 10 according to the embodiment of the invention, showing a state in which a bottom panel lid 16a is attached. FIG. 5 is a bottom view of the projector 10 according to the embodiment of the invention, showing a state in which the bottom panel lid 16a is removed so as to expose the excitation light shining device 70 which is the light source device.

As shown in FIGS. 4, 5, an opening portion 16b and the bottom panel lid 16a are provided in proximity to the center of a bottom panel 16 of the casing of the projector 10 in a position which coincides with where the excitation light shining device 70 is disposed. To describe this in detail, the bottom panel lid 16a, which constitutes a lid portion which can be mounted in the opening portion 16b, is fixed to the opening portion 16b of the bottom panel 16 with screws 16c, 16d. The opening portion 16b and the bottom panel lid 16a enable the maintenance of the excitation light shining device 70.

Next, the excitation light shining device 70, which is the light source device of the projector 10, will be described.

Figure 6:
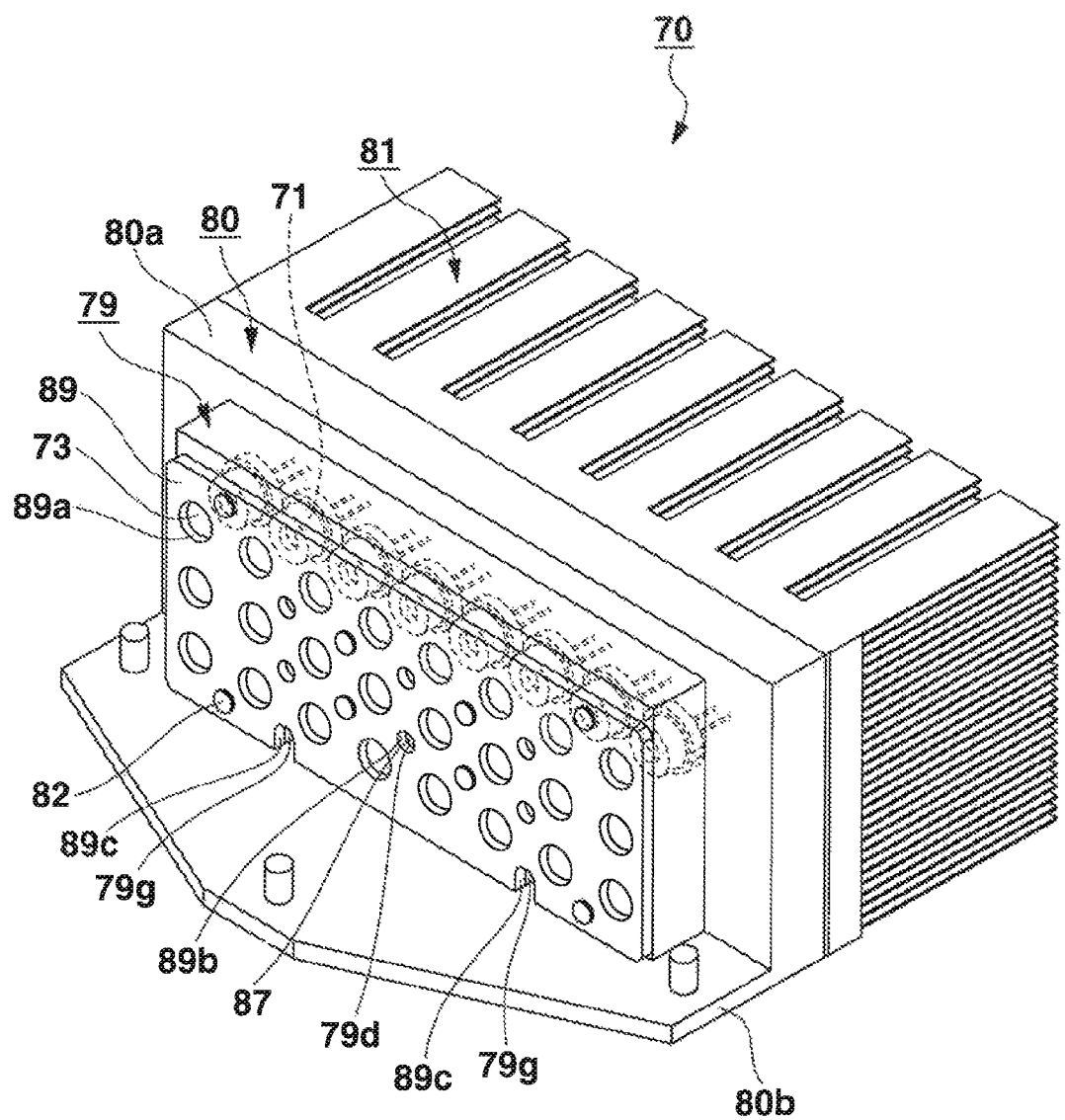
FIG. 6 is a perspective view of the light source device according to the embodiment of the invention.
Figure 7:
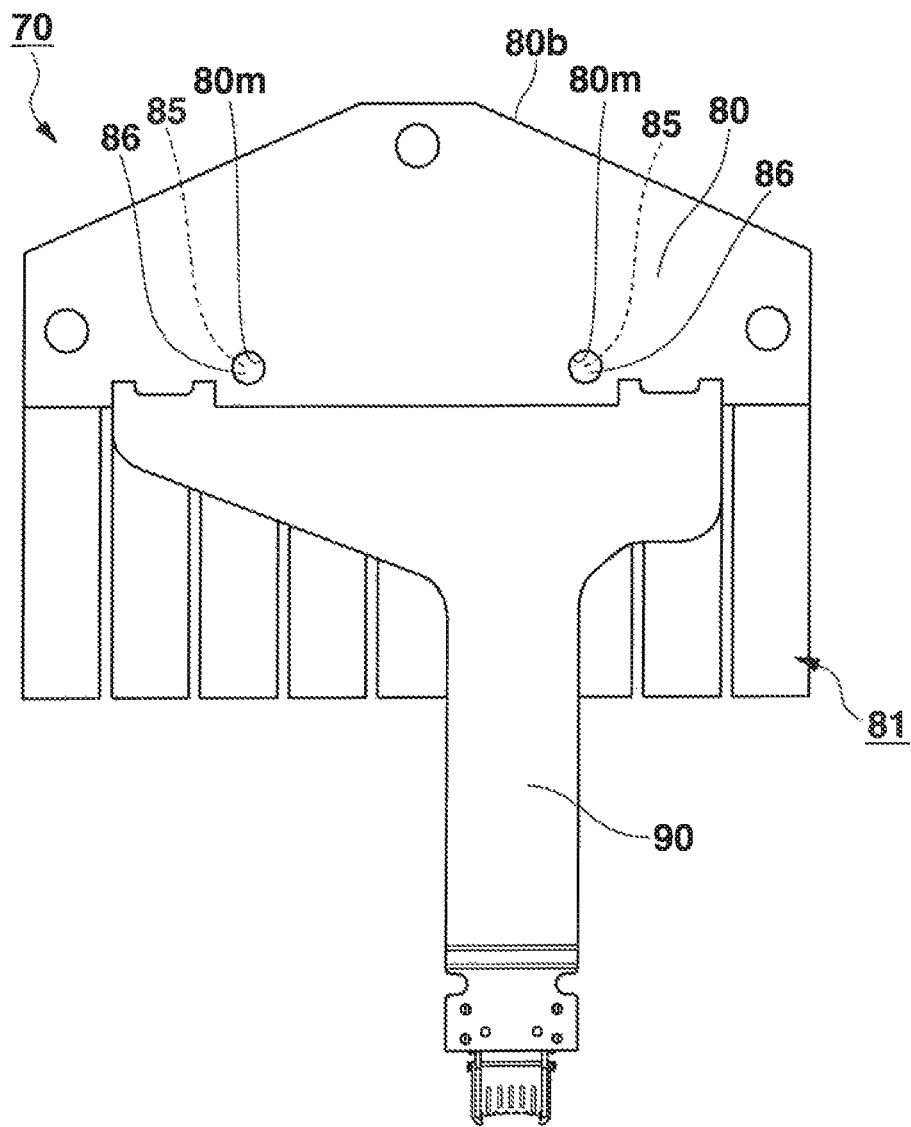
FIG. 7 is a bottom view of the light source device according to the embodiment of the invention.
Figure 8:
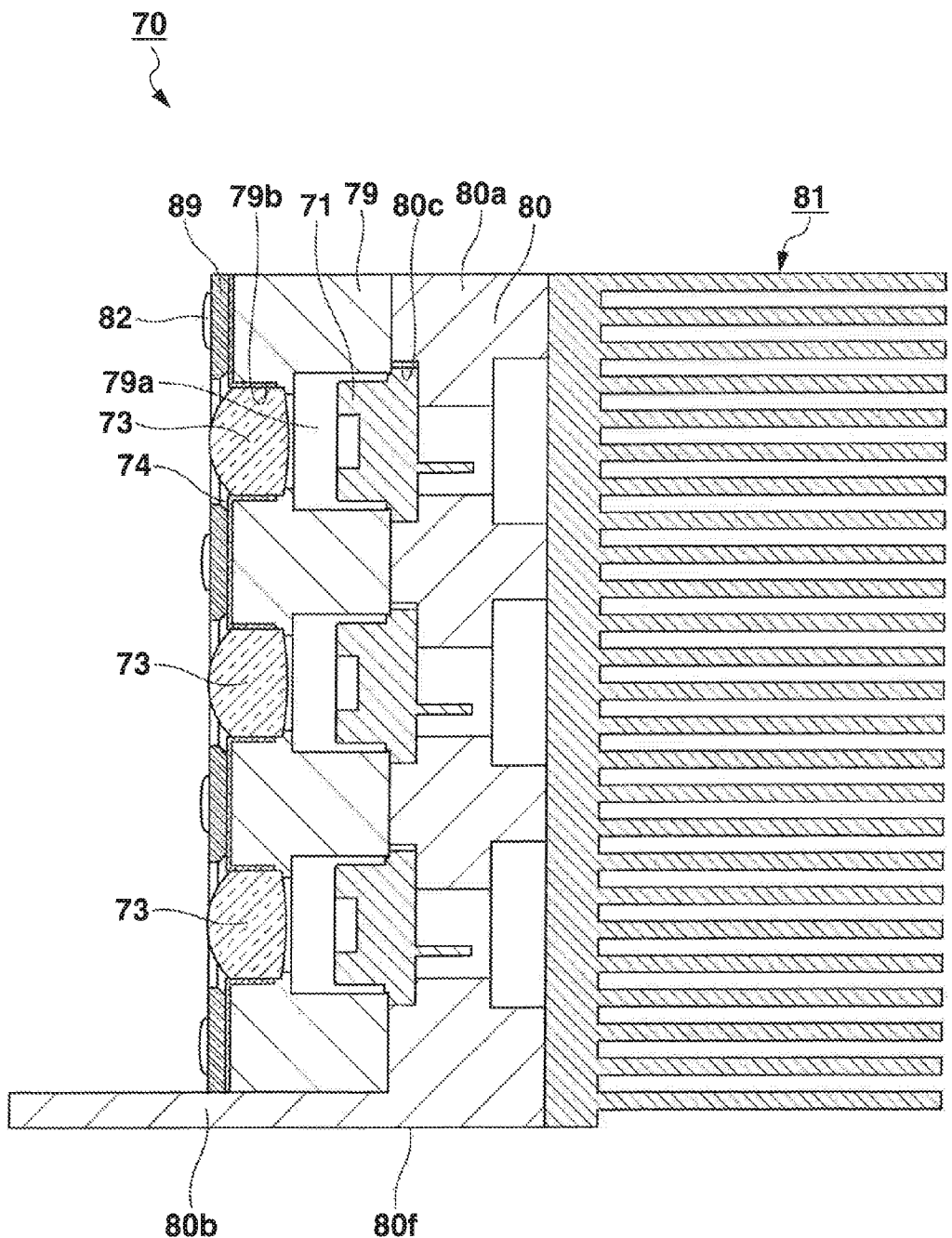
FIG. 8 is a sectional view of the light source device according to the embodiment of the invention which is taken along a plane which passes through excitation light sources and collimator lenses of the light source device.
Figure 9:
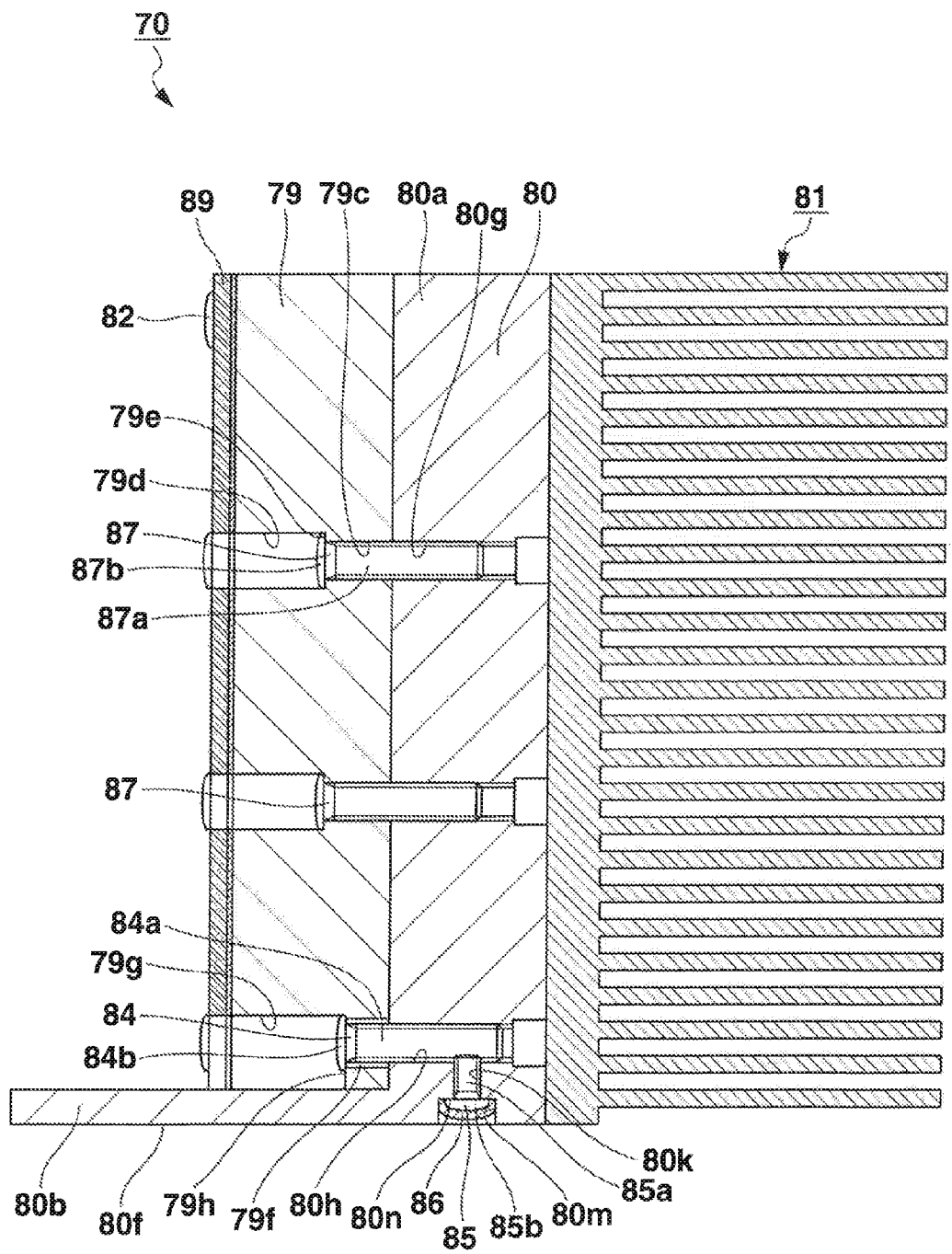
FIG. 9 is a sectional view of the light source device according to the embodiment of the invention which is taken along a plane which passes through a first screw member and a second screw member of the light source device.

FIG. 6 is a perspective view of the excitation light shining device 70 according to the embodiment of the invention. FIG. 7 is a bottom view of the excitation light shining device 70. FIG. 8 is a sectional view of the excitation light shining device 70 which is taken along a plane which passes through the excitation light sources 71 and the collimator lenses 73. FIG. 9 is a sectional view of the excitation light shining device 70 which is taken along a plane which passes through a first screw member 84 and a second screw member 85.

As shown in FIG. 6, the excitation light shining device 70 has a lens holding structure 79, which is a first holding structure, and a light source holding structure 80, which is a second holding structure, and laser diodes, which are light source elements as the excitation light sources 71, are held between the lens holding structure 79 and the light source holding structure 80. The light source holding structure 80 has a plate-shaped main body portion 80a and a projecting portion 80b and is hence formed into an L-shape in section. The light source holding structure 80 and the lens holding structure 79 are fixed together by a plurality of fixing screws 87, which are fixing members.

To describe this in detail, a fastening plate 89 is disposed on a front surface side of the lens holding structure 79. In this fastening plate 89, a number of large-diameter holes 89a are formed so as to correspond to the collimator lens 73. The fastening plate 89 is fixed to the lens holding structure 79 with screws 82. Additionally, a number of small-diameter holes 89b, into which the fixing screws 87 are inserted, are formed so as to be disposed between the large-diameter holes 89a.

The fixing screws 87 are inserted through the small-diameter holes 89b of the fastening plate 89 and are then screwed into recessed hole portions 79d and hole portions 79c, which will be described later, of the lens holding structure 79 and screw holes 80g of the light source holding structure 80, whereby the lens holding structure 79 and the light source holding structure 80 are fixed to each other. The heat sinks 81 are mounted behind the light source holding structure 80 with screws (not shown).

A plurality of substantially semicircular holes 89c are formed on a front surface side and at a lower end of the fastening plate 89, and these holes 89c are made to communicate with recess portions 79g of the lens holding structure 79. The first screw members 84, which will be described later, are inserted into the recess portions 79g of the lens holding structure 79.

In addition, as shown in FIG. 7, a plurality of recessed hole portions 80m, into which the second screw members 85 are inserted, are formed on a bottom surface side of the excitation light shining device 70. A sealing agent 86 is filled in these recessed hole portions 80m with the second screw members 85 inserted therein. A flexible circuit board 90, which is electrically connected to the excitation light sources 71, is provided on the bottom surface side of the excitation light shining device 70.

The constituent elements of the excitation light shining device 70 will be described as below.

The collimator lenses 73 are collective lenses which collect light emitted from the blue laser diodes which are excitation light sources 71. A lens mounting frame 74 is integrated with the collimator lens 73 in advance, and as shown in FIG. 8, the lens mounting frames 74 are secured to circumferential edges of the collimator lenses 73 with an adhesive and the like.

The collimator lenses 73 can be adjusted in position as adjustment of optical axes thereof, and such positional adjustment of the collimator lenses 73 can be executed by pressing circumferential edges of the lens mounting frames 74 which are securely integrated with the circumferential edges of the collimator lenses 73 with the adhesive so as to move the lens mounting frames 74 as required while preventing damage to the collimator lenses themselves.

The lens holding structure 79 is a holding member made of a heat-resistant resin. As shown in FIG. 8, a plurality of hole portions 79a are formed in the lens holding structure 79 as optical paths for light radiated from the excitation light sources 71 to the collimator lenses 73. Lens mounting holes 79b are formed in front of the hole portions 79a in the lens holding structure 79. The lens mounting holes 79b are smaller in diameter than the hole portions 79a. The lens mounting frames 74 and the collimator lenses 73 are disposed individually in the lens mounting holes 79b, whereby the collimator lenses 73 are held in the lens holding structure 79. The excitation light sources 71 are disposed at the rear of the corresponding hole portions 79a of the lens holding structure 79. Additionally, the fastening plate 89 has opening portions which are positioned in a front side of the lens holding structure 79 in positions corresponding to the collimator lenses 73, and the fastening plate 89 is disposed on the front side of the lens holding structure 79 so as to restrict the collimator lenses 73 from moving in a front-to-rear direction. This fastening plate 89 is fixed to the light source holding structure 80 with the screws 82.

As shown in FIG. 9, the hole portions 79c for the fixing screws 87 are formed in the lens holding structure 79, and a female screw thread is formed inside each hole portion 79c. A male screw thread formed on a main body portion 87a of the fixing screw 87 is made to be brought into engagement with the female screw thread of the hole portion 79c. The recessed hole portion 79d is formed on a front side of the hole portion 79c. The recess hole portion 79d is larger in diameter than the hole portion 79c, and a head portion 87b of the fixing screw 87 is disposed in the recessed hole portion 79d. The head portion 87b of the fixing screw 87 is made to be brought into engagement with a step portion 79e.

For example, with the screws 82 to fasten the fastening plate 89 loosened, the optical axes of the collimator lenses 73 and the excitation light sources 71 are adjusted, and thereafter, the screws 82 are tightened, whereby the optical axes can be adjusted with high accuracy.

The lens holding structure 79 has through holes 79*f* which are formed so as to extend towards the light source holding structure 80, which is the second holding structure, and the first screw members 84 are inserted into these through holes 79*f*. These through holes 79*f* are formed along a direction in which the lens holding structure 79 and the light source holding structure 80 are fitted together. The through hole 79*f* is slightly larger in diameter than a main body portion 84*a* of the first screw member 84, and a female screw thread is not formed inside of the through hole 79*f*. Because of this, with the first screw member 84 inserted in the through hole 79*f*, a gap is formed between the main body portion 84*a* of the first screw member 84 and the through hole 79*f* so that the first screw member 84 can loosely be fitted in the through hole 79*f*.

The recess portion 79*g*, which is larger than the through hole 79*f*, is formed at a front side of the through hole 79*f* in the lens holding structure 79, and the head portion 84*b* of the first screw member 84 is disposed in the recess portion 79*g*. The head portion 84*b* of the first screw member 84 is made to be brought into engagement with a step portion 79*h*.

The light source holding structure 80 is a heat dissipating member which is made of a material such as aluminum or copper. As shown in FIGS. 7 to 9, the light source holding structure 80 has the substantially L-shaped section. Specifically speaking, the light source holding structure 80 has the plate-shaped main body portion 80*a* and the projecting portion 80*b* which projects forwards from a lower end of the plate-shaped main body portion 80*a* and which has a substantially pentagonal shape in which a central portion projects further than both ends. The plate-shaped main body portion 80*a* and the projecting portion 80*b* are formed integrally of the same material. The plate-shaped main body portion 80*a* is disposed between the lens holding structure 79 and the heat sinks 81. The plate-shaped main body portion 80*a* of the light source holding structure 80 and the lens holding structure 79 are fixed to each other with the fixing screws 87 with the excitation light sources 71 held therebetween.

In addition, as shown in FIG. 8, a plurality of mounting holes 80*c* are formed in the plate-shaped main body portion 80*a*, and the excitation light sources 71 are mounted in the mounting holes 80*c*. These mounting holes 80*c* are disposed in a matrix fashion. The mounting holes 80*c* are formed in positions which correspond to the hole portions 79*a* of the lens holding structure 79. Lead wire terminal portions (not shown) are attached to rear sides of the excitation light sources 71 which are disposed in the mounting holes 80*c*, whereby the excitation light sources 71 are electrically connected to the flexible circuit board 90 via the lead wire terminal portions. The flexible circuit board 90 is electrically connected to the light source control circuit 41, the control unit 38 and the like.

Additionally, a plurality of the screw holes 80*g* are disposed into a matrix fashion in the plate-shaped main body portion 80*a*. As shown in FIG. 9, these screw holes 80*g* are formed so as to communicate with the hole portions 79*c* of the lens holding structure 79. A female screw thread is formed inside each of the screw holes 80*g*, so that the corresponding fixing screws 87 are screwed to fit therein.

In addition, screw holes 80*h*, which are first screw holes and which communicate with the through holes 79*a* in the lens holding structure 79, are formed in a surface of the plate-shaped main body portion 80*a* which faces the lens holding structure 79 so as to extend towards the heat sinks 81. A female screw thread is formed inside of each of the thread holes 80*h*. The screw holes 80*h* are formed smaller in diameter than the through holes 79*f* of the lens holding structure 79, and the main body portions 84*a* of the first screw members 84 are made to be brought into engagement therewith. In the excitation light shining device 70 according to this embodiment, the through holes 79*f* of the lens holding structure 79 and the screw holes 80*h* of the light source holding structure 80 are provided in proximity to the projecting portion 80*b*.

Screw holes 80*k*, which are second screw holes, are formed in a bottom surface 80*f* of the light source holding structure 80 which is a surface which is substantially at right angles to the surface facing the lens holding structure 79 as shown in FIG. 9. The screw hole 80*k* is formed to extend upwards from the bottom surface 80*f* of the light source holding structure 80 so as to intersect the screw hole 80*h*, which is the first screw hole, substantially at right angles. The screw hole 80*k* is also formed to communicate with the screw hole 80*h*. Namely, the screw hole 80*k* is formed along a direction which is at right angles to the direction in which the lens holding structure 79 and the light source holding structure 80 are fitted together. A female screw thread is formed inside each of the screw holes 80*k*, and a male screw thread on a main body portion 85*a* of the second screw member 85 is brought into engagement with the female screw thread in the screw hole 80*k*.

As shown in FIGS. 7, 9, the recessed hole portions 80*m*, which accommodate the head portions 85*b* of the second screw members 85, are formed on a surface of the bottom surface 80*f* of the light source holding structure 80. The recessed hole portion 85*m* has a larger diameter than that of the screw hole 80*k* and is formed concentrically with the screw hole 80*k*. The head portion 85*b* of the second screw member 85 is disposed in the recessed hole portion 80*m*, and the head portion 85*b* of the second screw member 85 is brought into engagement with a step portion 80*n*.

As shown in FIG. 9, the fixing screw 87 has the main body portion 87*a* and the head portion 87*b*. The male screw thread formed on the main body portion 87*a* is screwed into the hole portion 79*c* of the lens holding structure 79 and the screw hole 80*g* of the light source holding structure 80 for engagement with the female screw threads formed in the hole portion 79*c* and the screw hole portion 80*g*, whereby the lens holding structure 79 and the light source holding structure 80 are joined into an integral body. The head portion 87*b* of the fixing screw 87 is formed larger in diameter than the hole portion 79*c* of the lens holding structure 79 and the screw hole 80*g* of the light source holding structure 80 but is formed slightly smaller in diameter than the recessed hole portion 79*d* of the lens holding structure 79, whereby the head portion 87*b* is brought into engagement with the step portion 79*e* of the lens holding structure 79.

The first screw member 84 has the main body portion 84*a* and the head portion 84*b*. A male thread is formed on the main body portion 84*a* of the first screw member 84 as a screw thread portion. The main body portion 84*a* is formed slightly smaller in diameter than the through hole 79*f* of the lens holding structure 79 and is formed substantially the same in diameter as the screw hole 80*h* of the light source holding structure 80. At the time of fabrication, the first screw member 84 is inserted into the through hole 79*f* of the lens holding structure 79, in which state the main body portion 84*a* is loosely fitted in the through hole 79*f* and is brought into engagement with the screw hole 80*h* of the light source holding structure 80. In the first screw member 84, the head portion 84*b* is formed larger in diameter than the through hole 79*f* but is formed smaller in diameter than the recess portion 79*g* of the lens holding structure 79. Because of this, the first screw member 84 functions to prevent the separation of the lens holding structure 79 from the light source holding structure 80. As this occurs, the head portion 84*b* of the first screw member 84 may be disposed so as to be brought into engagement with the screw hole 80h of the light source holding structure 80 at the step portion 79h or may be disposed so as to form a gap between the step portion 79h and itself.

As will be described later, the screw thread portion of the main body portion 84a of the first screw member 84 is formed so as to be plastically deformed by an external force of a predetermined magnitude. The head portion 84b of the first screw member 84 is formed larger in diameter than the through hole 79f of the lens holding structure 79 and is disposed within the recessed hole portion 79d of the lens holding structure 79.

The second screw member 85 has the main body portion 85a and the head portion 85b. The main body portion 85a is screwed into the screw hole 80k which is the second screw hole of the light source holding structure 80, while a distal end of the main body portion 85a presses the screw thread portion of the main body portion 84a of the first screw member 84 in a direction which is at right angles to an axial direction of the main body portion 84a of the first screw member 84, whereby the screw thread portion is plastically deformed. By so doing, the second screw member 85 prevents the removal of the first screw member 84 which is mounted in the light source holding structure 80. In addition, the head portion 85b of the second screw member 85 is accommodated within the recessed hole portion 80m which is formed on the bottom surface 80f of the light source holding structure 80.

The sealing agent 86 is filled in the recessed hole portion 80m in such a state that the head portion 85b of the second screw member 85 is accommodated within the recessed hole portion 80m of the light source holding structure 80, which is the second holding structure. Because of this, the head portion 85b of the second screw member 85 is covered with the sealing agent 86 in such a state that the head portion 85b is accommodated within the recessed hole portion 80m. For example, an adhesive, a thermoset resin, a UV radiation curable resin or the like can be used as the sealing agent 86.

Next, a method will be described for incorporating the excitation light shining device 70 which is the light source device according to the embodiment of the invention into the projector 10.

Figure 10A:
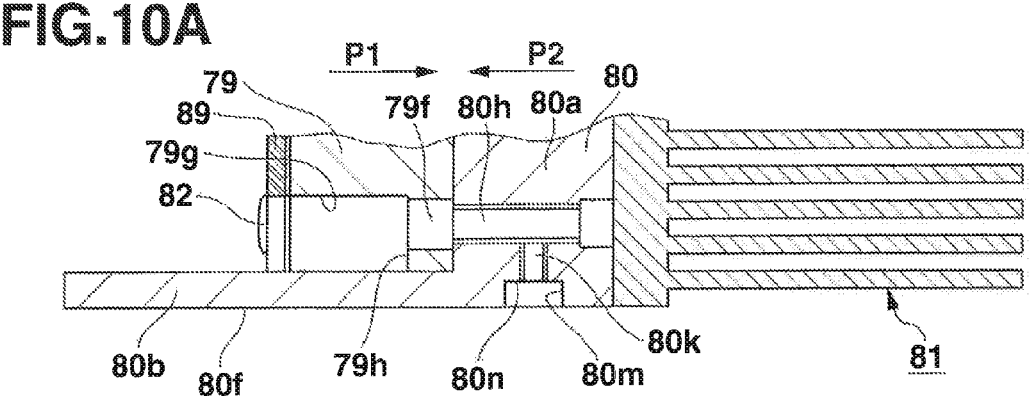
FIG. 10A is a diagram showing a first step of a fabrication order of the light source device of the projector according to the embodiment of the invention.

FIGS. 10A to 10D are diagrams showing steps of a fabrication order of the excitation light shining device 70. FIG. 11 is a flowchart explaining a production method of the projector 10 according to the embodiment of the invention.

In step S101, a step is executed of fabricating the excitation light shining device 70 which is the light source device.

To describe the step in detail, the collimator lenses 73 are mounted in the lens holding structure 79. Following this, the excitation light sources 71 are mounted in the light source holding structure 80. Then, as shown in FIG. 10A, the lens holding structure 79 and the light source holding structure 80 are moved along the fitting directions P1, P2, whereby the lens holding structure 79 and the light source holding structure 80 are fitted together.

Namely, the fixing screws 87 are inserted and screwed into the hole portions 79c of the lens holding structure 79 and the screw holes 80g of the light source holding structure 80. By so doing, the light source holding structure 80 and the lens holding structure 79 are integrated with each other.

In step S105, a step is executed of adjusting the optical axis of the excitation light shining device 70 which is the light source device.

To describe this step in detail, the collimator lenses 73 which are held in the lens holding structure 79 and the excitation light sources 71 are adjusted with respect to their optical axes, and the collimator lenses 73 are fixed to the lens holding structure 79 by the fastening plate 89.

Figure 10B:
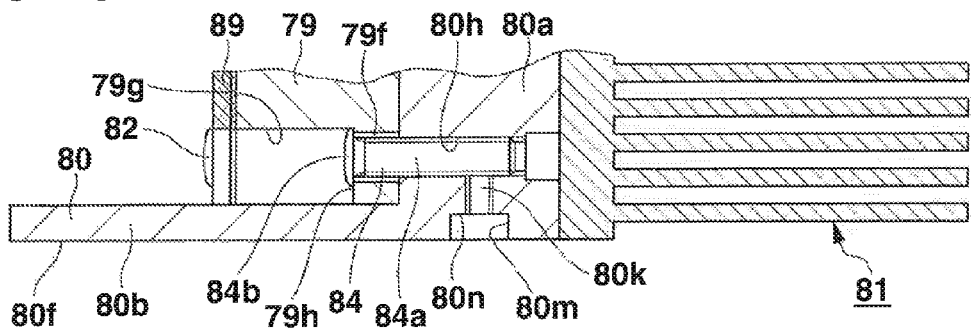
FIG. 10B is a diagram showing a second step of the fabrication order of the light source device of the projector according to the embodiment of the invention.
Figure 11:
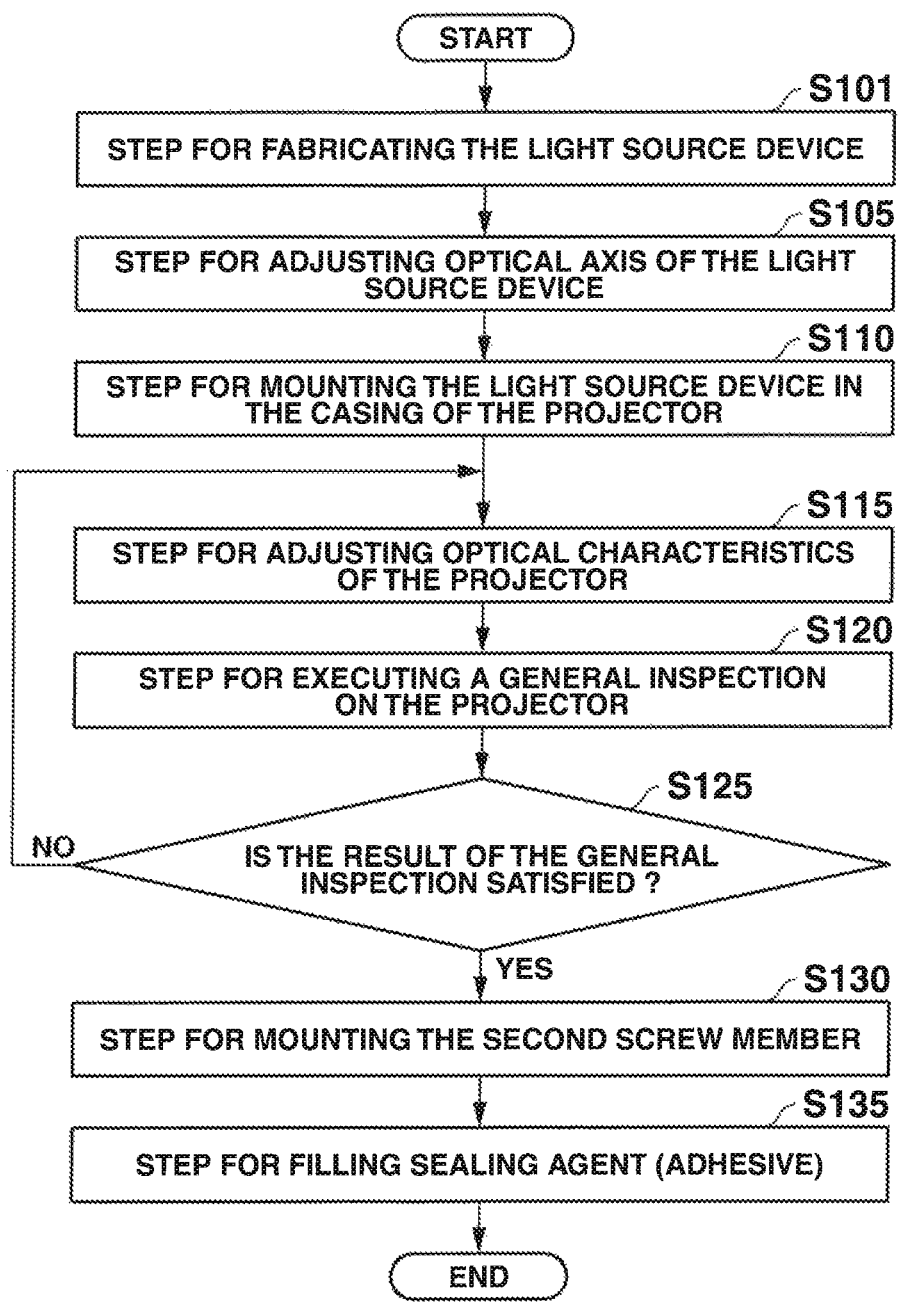
FIG. 11 is a flowchart explaining a production method of the projector according to the embodiment of the invention.

Then, as shown in FIG. 10B, the main body portions 84a of the first screw members 84 are inserted into the through holes 79f of the lens holding structure 79, so that the main body portions 84a are loosely fitted in the through holes 79f. Then, the main body portions 84a are brought into engagement with the screw holes 80h of the light source holding structure 80. This mounting of the first screw members 84 may be executed before or after the optical axis of the excitation light sources 71 and the collimator lenses 73 are adjusted.

In the embodiment, the optical axes of the collimator lenses 73 and the excitation light sources 71 are adjusted after the lens holding structure 79 and the light source holding structure 80 are fixed together by the fixing screws 87. However, the invention is not limited to the embodiment. For example, the lens holding structure 79 and the light source holding structure 80 may be fixed together by the fixing screws 87 after the optical axes of the collimator lenses 73 and the excitation light sources 71 are adjusted.

In step S110, a step is executed of mounting the excitation light shining device 70 in the state where the light source holding structure 80 and the lens holding structure 79 are now fixed together by the fixing screws 87 in the casing of the projector 10.

To describe this step in detail, the excitation light shining device 70 is installed in a predetermined position within the casing of the projector 10 and is then fixed to the casing.

In step 115, a step is executed of adjusting the optical characteristics of the projector 10.

To describe this step in detail, as adjustment of the optical characteristics of the projector 10, for example, the optical characteristics of the optical system unit 160 including the light guiding optical system 140, the light source side optical system 170 and the projection side optical system 220, the display element 51, and the excitation light shining device 70 are adjusted.

In step S120, a step is executed of executing a general inspection and a final adjustment on the projector 10 in the state where the excitation light shining device 70 is incorporated with respect to an overall operation.

To describe this step in detail, an operation check is executed on whether or not the illuminance and the like by the projector 10 satisfies the standard level.

In step S125, a step is executed of determining from the result of the general inspection whether or not the projector 10 is accepted as a final product which satisfies the stipulated standard level.

If it is determined from the result of the general inspection that the projector 10 satisfies the stipulated standard level, the fabrication flow proceeds to an operation in step S130.

In step S130, a step is executed of mounting the second screw members 85 in the excitation light shining device 70 which is incorporated inside the projector 10.

Figure 10C:
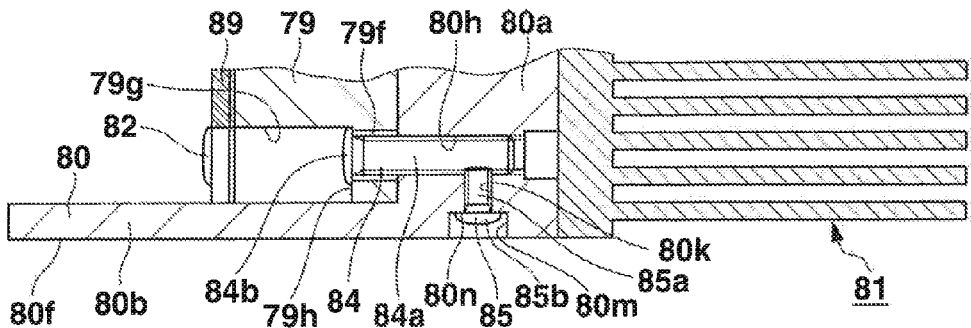
FIG. 10C is a diagram showing a third step of the fabrication order of the light source device of the projector according to the embodiment of the invention.

To describe this step in detail, with the bottom panel lid 16a of the casing of the projector 10 removed as shown in FIG. 5, the screw holes 80k, which are formed in the bottom surface 80f of the light source holding structure 80 of the excitation light shining device 70 and into which the second screw members are mounted, are exposed in the opening portion 16b and the main body portions 85a of the second screw members 85 are screwed into the screw holes 80k. As this occurs, as shown in FIG. 10C, the main body portion 85a of the second screw member 85 is screwed strongly into the screw hole 80k so that the distal end portion of the main body portion 85a of the second screw member 85 presses the screw thread portion which is formed on the main body portion 84a of the first screw member 84 so as to plastically deform the screw thread portion of the main body portion 84a. Because of this, it becomes difficult to remove the first screw member 84 of which the screw thread portion is plastically deformed from the lens holding structure 79.

Figure 10D:
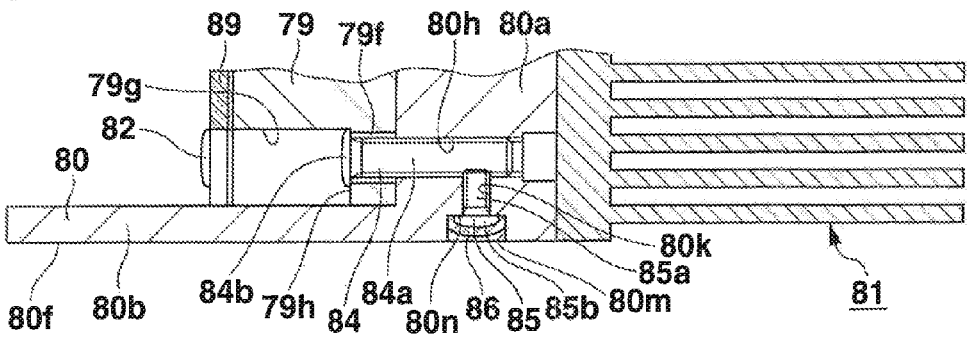
FIG. 10D is a diagram showing a fourth step of the fabrication order of the light source device of the projector according to the embodiment of the invention.

In step S135, as shown in FIGS. 5 and 10D, with the bottom panel lid 16a of the casing of the projector 10 removed therefrom, the head portions 85b of the second screw members 85 which are mounted in the light source holding structure 80 of the excitation light shining device 70 are exposed in the opening portion 16b. Then, with the head portions 85b accommodated in the recessed hole portions 80m of the light source holding structure 80, the sealing agent 86 is filled in the recessed hole portions 80m, so that the head portions 85b of the second screw members 85 are embedded in the recessed hole portions 80m. When the sealing agent 86 hardens after a lapse of a predetermined length of time, it becomes difficult to remove the second screw members 85. Thereafter, the bottom panel lid 16a is fixed to the opening portion 16b with the screws 16c, 16d.

In addition, if it is determined from the result of the general inspection for the operation of the projector 10 that the projector 10 does not satisfy the stipulated standard level in step S135, a predetermined reinstallation is executed. Namely, the execution of step goes back to the step S115 and then the steps S115 and S120 are executed recurrently.

Thus, as has been described heretofore, according to the invention, there is provided the excitation light shining device 70 in which the excitation light sources 71 which are light source elements are held between the lens holding structure 79, which is the first holding structure, and the light source holding structure 80, which is the second holding structure. In the excitation light shining device 70, the lens holding structure 79 has the through holes 79f which are formed to extend towards the light source holding structure 80 and which allows the first screw members 84 to be put therethrough. The light source holding structure 80 has the screw holes 80h which are the first screw holes which communicate with the through holes 79f of the lens holding structure 79 and into which the rod-shaped main body portions 84a of the first screw members 84 are screwed and the screw holes 80k which are the second screw holes which communicate with the screw holes 80h substantially at right angles and into which the second screw members 85 are screwed. Then, in such a state that the first screw members 84 penetrate the through holes 79f of the lens holding structure 79 and are then screwed into the screw holes 80h which are the first screw holes of the light source holding structure 80, the second screw members 85 press on the screw thread portions of the main body portions 84a of the first screw members 84 so as to plastically deform the screw thread portions by the distal end portions of the main body portions 85a thereof. Because of this, the screw thread portions of the main body portions 84a of the first screw members 84 are pressed to thereby be plastically deformed by the distal end portions of the second screw members 85. Therefore, it becomes difficult to remove the first screw members 84.

Namely, it is possible to provide the light source device which can prevent the removal of the excitation light sources 71, which are the light source elements, of the excitation light shining device 70, which is the light source device, for other applications with the simple construction and without performing the complex and troublesome steps at the time of production, the projector 10 which incorporates the light source device and the method for incorporating the light source device in the projector 10.

Further, according to the embodiment of the invention, in inserting the first screw members 84 into the through holes 79f of the lens holding structure 79 for engagement with the screw holes 80h of the light source holding structure 80, the first screw members 84 loosely fit in the through holes 79f of the lens holding structure 79. Therefore, the relative position error of the lens holding structure 79 to the light source holding structure 80 can be prevented. In addition, even when an external force is applied to the first screw members 84 in a direction which is substantially at right angles to an axial direction thereof in such a state that the first screw members 84 are in engagement with the screw holes 80h of the light source holding structure 80, since the first screw members 84 loosely fit in the through holes 79f of the lens holding structure 79, the relative position error of the lens holding structure 79 to the light source holding structure 80 can be prevented.

Additionally, according to the embodiment of the invention, since the lens holding structure 79 and the light source holding structure 80 are integrated into the one unit with the fixing screws 87 which are the fixing members, the lens holding structure 79 and the light source holding structure 80 can be fixed together in a more ensured fashion.

Additionally, according to the embodiment of the invention, since the lens holding structure 79 is configured so as to hold the collimator lenses 73 which collect light emitted from the excitation light sources 71, the assemblage and optical axes adjustment of the excitation light sources 71 and the collimator lenses 73 can be facilitated.

According to the embodiment of the invention, the excitation light sources 71 which are the light source elements are laser diodes which are high-output light emitting elements. Because of this even when, for example, high-luminance laser diodes are adopted as the excitation light sources 71, since the excitation light shining device 70 is constructed so that the separation of the lens holding structure 79 from the light source holding structure 80 is difficult, the removal of the high-luminance laser diodes from the high-luminance excitation light shining device 70 can be prevented.

Additionally, according to the embodiment of the invention, since the head portions 85b of the second screw members 85 are covered by the sealing agent 86, the removal of the second screw members 85 from the light source holding structure 80 is made more difficult. Because of this, the removal of the first screw members 84 is made more difficult, and therefore, the removal of the excitation light sources 71 from the excitation light shining device 70 can be prevented.

Further, according to the embodiment of the invention, the recessed hole portions 80m which accommodate the head portions 85b of the second screw members 85 are provided on the surface of the bottom surface 80f side of the light source holding structure 80 which is the second holding structure. The head portions 85b of the second screw members 85 are covered by the sealing agent 86 while being accommodated in the recessed hole portions 80m of the light holding structure 80. Because of this, the removal of the second screw members from the light source holding structure 80 is made more difficult. Namely, the removal of the excitation light sources 71 from the excitation light shining device 70 can be prevented.

In addition, according to the embodiment of the invention, the projector 10 includes the excitation light shining device 70 which is the light source device, the display element 51 which forms an optical image with light emitted by the excitation light shining device 70 and the projection side optical system 220 which projects the optical image formed by the display element 51 on to the screen. Because of this, it is possible to provide the projector 10 which can prevent the removal of the excitation light sources 71 for other applications with the simple configuration and without performing the complex and troublesome steps at the time of production.

Further, according to the embodiment of the invention, the screw holes 80k which are the second screw holes of the light source holding structure 80 of the excitation light shining device 70 which is the light source device and the second screw member 85 which are disposed in the screw holes 80k are provided on the bottom surface side of the excitation light shining device 70. The excitation light shining device 70 is disposed inside the opening portion 16b provided in the bottom surface of the projector 10. Because of this, it is possible to provide the projector 10 which can prevent the removal of the light source elements of the light source device in the projector casing which pass the operation inspection for other applications with the simple construction and without performing the complex and troublesome steps at the time of production.

Additionally, according to the embodiment of the invention, the lens holding structure 79 which is the first holding structure and the light source holding structure 80 which is the second holding structure are fixed together with the fixing screws 87 which are the fixing members after the optical axes adjustment of the collimator lenses 73 and the excitation light sources 71 which are the light source elements has been performed, or after the lens holding structure 79 and the light source holding structure 80 are fixed together with the fixing screws 87, the light axes adjustment of the collimator lenses 73 and the excitation light sources 71 is performed. Then, the excitation light shining device 70 in the state where the lens holding structure 79 and the light source holding structure 80 are fixed together by passing the first screw members 84 through the through holes 79f of the lens holding structure 79 so as to be screwed into the screw holes 80h which are the first screw holes of the light source holding structure 80 is incorporated in the casing of the projector 10. Following this, the optical characteristics of the projector 10 are adjusted, and thereafter, the second screw members 85 are screwed strongly into the screw holes 80k which are the second screw holes of the light source holding structure 80 so that the distal ends of the main body portions 85a of the second screw members 85 press the screw thread portions of the main body portions 84a of the first screw members 84 so as to deform the screw thread portions plastically (S130). Thus, by making use of this fabrication method, the excitation light shining device 70 which is configured in the way that has been described above is incorporated in the projector 10. Because of this, it is possible to provide the projector fabrication method for incorporating in the projector the light source device which can prevent the removal of the light source elements of the light source device in the projector casing which pass the operation inspection for other applications with the simple construction and without performing the complex and troublesome steps at the time of production.

As a projector according to a comparison example, there is a projector which is constructed so as to prevent the removal of excitation light sources 71 without using the first screw members 84 and the second screw members 85 according to the embodiment of the invention and by applying an anaerobic adhesive in a gap between a lens holding structure 79 and a light source holding structure 80 so as to secure the lens holding structure 79 and the light source holding structure 80 together.

In the case of the projector according to the comparison example, for example, a plurality of spacers having different thicknesses are prepared, a spacer having a thickness suited to the gap between the lens holding structure 79 and the light source holding structure 80 is selected and is then disposed in the gap, and thereafter, the anaerobic adhesive is applied so as to secure the lens holding structure 79 and the light source holding structure 80 together. Thus, the projector according to the comparison example requires the complex and troublesome production steps.

On the other hand, according to the fabrication method for incorporating the light source device in the projector 10, it is possible to fabricate the light source device having the advantage described above and the projector 10 which incorporates therein the light source device by going through the simple production steps without performing the aforesaid complex and troublesome steps.

The invention is not limited to the embodiment that has been described heretofore and hence can freely be modified or improved without departing from the spirit and scope of the invention.

In the projector 10 according to the embodiment, the sealing agent 86 is applied to the second screw members 85 so as to make it difficult for the second screw members 85 to be removed. However, the invention is not limited thereto.

For example, the shape of a slot in the head portion 85b of the second screw member 85 may be modified so as to make difficult the removal of the second screw members 85. Additionally, a rivet having a shape which makes it difficult for the rivet to be removed may be used in place of the second screw member 85.

That is to say, other second member may be used instead of the second screw member 85, if it is configured so as to insert in order to press and deform the first screw member 84.

In addition, the embodiment is described as the recessed hole portions 80m which accommodate the head portions 85b of the second screw members 85 being provided on the bottom surface 80f side of the light source holding structure 80. However, the recessed hole portions 80m are not necessarily required and hence may not be provided. However, the recessed hole portions 80m provide the advantage that the sealing agent 86 is easily filled and the head portions 85b are easily sealed by the sealing agent 86.

Additionally, the embodiment is described as the light source holding structure 80 and the lens holding structure 79 being integrated into the one unit by inserting and screwing the fixing screws 87 into the hole portions 79c of the lens holding structure 79 and the screw holes 80g of the light source holding structure 80. However, without using the fixing screws 87, the lens holding structure 79 and the light source holding structure 80 may be integrated into one unit with an adhesive by press securing the lens holding structure 79 and the light source holding structure 80 together by use of a jig.

In addition, the optical axes adjustment is described as being performed in step S105 in FIG. 11. However, in the case of the adhesive being used in place of the fixing screws 87 as has been described above, the optical axes adjustment may be made to be performed before the adhesive hardens.

What is claimed is:
1. A light source device comprising:
a light source element which is held between a first holding structure and a second holding structure, wherein
the first holding structure has a through hole which is formed so as to extend towards the second holding structure and which allows a first screw member to be put therethrough, wherein
the second holding structure has (a) a first screw hole which communicates with the through hole and into which a rod-shaped main body portion of the first screw member is screwed and (b) a second insertion hole which communicates with the first screw hole substantially at right angles and into which a second insertion member is inserted, and wherein in a state in which that the first screw member is put through the through hole and screwed into the first screw hole, the second insertion member presses a screw thread portion of the main body portion of the first screw member so as to deform the screw thread portion plastically by a distal end portion of the second insertion member.

2. A light source device as set forth in claim 1, wherein the first screw member loosely fits in the through hole.

3. A light source device as set forth in claim 1, further comprising:
a fixing member which integrates the first holding structure and the second holding structure into one unit.

4. A light source device as set forth in claim 1, wherein the first holding structure holds a collimator lens which collects light emitted from the light source element.

5. A light source device as set forth in claim 1, wherein the light source element comprising a laser diode.

6. A light source device as set forth in claim 1, wherein a head portion of the second insertion member is covered by a sealing agent.

7. A light source device as set forth in claim 6, wherein a surface of the second holding member has a recessed hole portion which accommodates the head portion of the second insertion member, and wherein the head portion of the second insertion member is covered by the sealing agent in a state in which the head portion is accommodated in the recessed hole portion.

8. A projector comprising:
a light source device;
a display element which forms an optical image with light emitted by the light source device;
a projection side optical system which projects the optical image formed by the display element on to a screen; and
a projector control unit which controls the light source device and the display element, wherein
the light source device is the light source device set forth in claim 1.

9. A projector as set forth in claim 8, wherein
the second insertion hole and the second insertion member disposed in the second insertion hole are provided on a bottom surface side of the light source device, and wherein
the light source device is disposed inside an opening portion which is provided in a bottom surface of the projector.

10. A light source device fabrication method for fabricating a light source device which holds a light source element between a first holding structure and a second holding structure comprising:
a first preparatory step of preparing in the first holding structure a through hole which is formed so as to extend towards the second holding structure and which allows a first screw member to be put therethrough;
a second preparatory step of preparing in the second holding structure (a) a first screw hole which communicates with the through hole and into which a rod-shaped main body portion of the first screw member is screwed and (b) a second insertion hole which communicates with the first screw hole substantially at right angles and into which a second insertion member is inserted;
a screwing step of allowing the first screw member to be put through the through hole to thereby be screwed into the first screw hole; and
a plastic deformation step of inserting the second insertion member into the second insertion hole so that a distal end of the second insertion member presses a screw thread portion of the first screw member so as to plastically deform the screw thread portion.

11. A light source device fabrication method as set forth in claim 10, wherein
the light source device further comprises a fixing member which integrates the first holding structure and the second holding structure into one unit, and wherein
the light source device fabrication method further comprising a fixing step of integrating the first holding structure and the second holding structure into one unit by the fixing member which is executed before the screwing step.

12. A light source device fabrication method as set forth in claim 10, wherein
the second holding structure holds a collimator lens which collects light emitted from the light source element, wherein
the light source device fabrication method further comprising an optical axes adjustment step of adjusting optical axes of the collimator lens and the light source element, and wherein
the optical axes adjustment step is executed before the fixing step or after the fixing step.

13. A light source device fabrication method as set forth in claim 10, further comprising:
a sealing step of embedding a head portion of the second insertion member with a sealing agent which is executed after the plastic deformation step.

14. A projector fabrication method for fabricating a projector including a light source device, comprising:
an incorporating step of incorporating a light source device fabricated by the light source device fabrication method as set forth in claim 10 into a casing of a projector; and
an optical characteristics adjusting step of adjusting optical characteristics of the projector, wherein
the optical characteristics adjusting step is executed after the screwing step and before the plastic deformation step.

* * * * *